United States Patent [19]
Dugan

[11] Patent Number: 5,709,018
[45] Date of Patent: Jan. 20, 1998

[54] SEAL MANIPULATION TOOLS

[76] Inventor: Charles E. Dugan, 109 Echo La., Bethalto, Ill. 62010

[21] Appl. No.: 430,323

[22] Filed: Apr. 28, 1995

[51] Int. Cl.$^6$ ................................................. B23P 19/02
[52] U.S. Cl. ........................................... 29/235; 29/263
[58] Field of Search ............................. 29/263, 265, 235, 29/256, 258, 259, 898.08, 426.5

[56] References Cited

U.S. PATENT DOCUMENTS

| | | |
|---|---|---|
| 2,876,533 | 3/1959 | Oberley et al. . |
| 3,014,271 | 12/1961 | Englund . |
| 3,123,901 | 3/1964 | Traugott . |
| 3,386,154 | 6/1968 | Thill . |
| 3,535,765 | 10/1970 | Denehie ........................... 29/263 |
| 3,611,540 | 10/1971 | Gibu . |
| 3,651,557 | 3/1972 | Bagley . |
| 4,050,136 | 9/1977 | Shultz ............................... 29/263 |
| 4,509,241 | 4/1985 | Freeland et al. . |
| 4,551,898 | 11/1985 | Provost . |
| 4,724,608 | 2/1988 | Parrott ............................... 29/263 |
| 5,255,435 | 10/1993 | Shultz ............................... 29/263 |
| 5,355,574 | 10/1994 | Zweekly et al. . |

*Primary Examiner*—Robert C. Watson
*Attorney, Agent, or Firm*—Senniger, Powers, Leavitt & Roedel; Daniel M. Fitzgerald

[57] ABSTRACT

Seal removal and installation tools for removing and installing seals from difficult to access locations. The seal removal tool is capable of gripping the seal without passing between the seal and the surface with which it is in sealing engagement. The seal installation tool is capable of simultaneously installing two seals on opposite ends of a shaft. The seal installation tool precisely aligns the seals and the shaft and positively locates the seal in on the shaft to minimize the chance of damaging the seal. The seal installer also gradually expands the seal to the diameter of the shaft so that stresses in the seal are substantially uniform during installation.

15 Claims, 4 Drawing Sheets

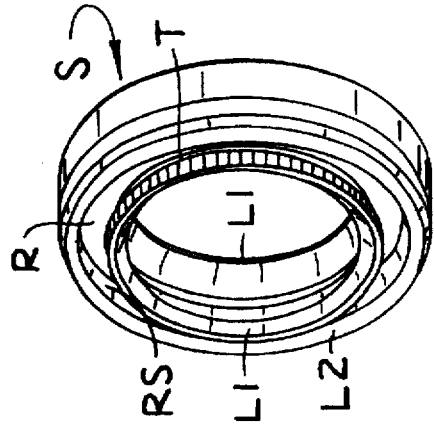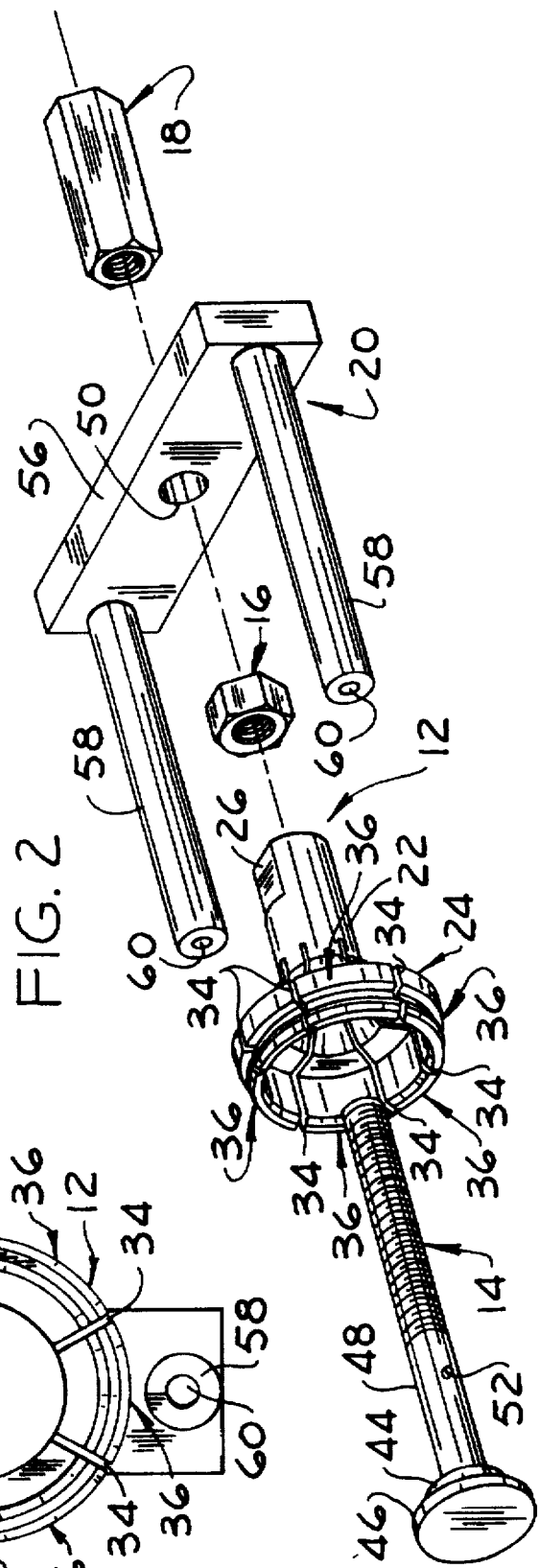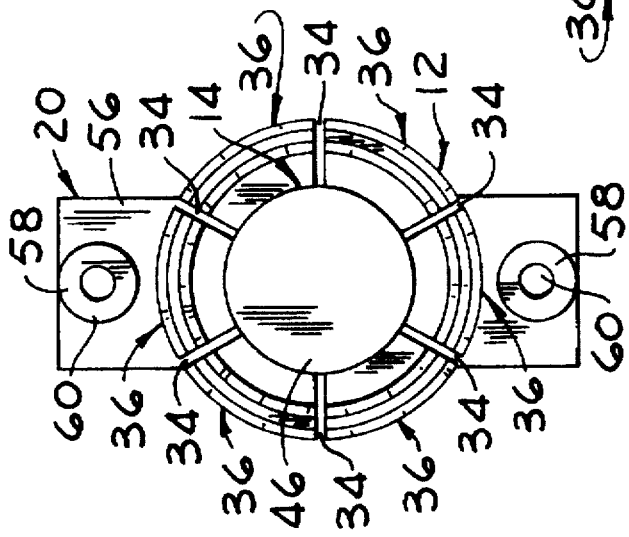

SEAL MANIPULATION TOOLS

BACKGROUND OF THE INVENTION

This invention relates generally to tools for manipulating seals and more particularly to tools for installing and removing annular seals.

Seals which operate in high wear environments, such as annular seals on a rotating shaft in a helicopter engine, or other hostile environments, will require removal and replacement from time to time. For instance, a seal which engages and seals against a rotating or otherwise moving surface will eventually become too worn to seal properly. Of course, temperature extremes or changes, or chemicals present in the operating environment of the seal may also shorten its life. It is desirable to be able to remove the seal as quickly as possible, but without damage to the seal or the structure surrounding the seal (e.g., the engine). Removal of the seal without damage for routine maintenance procedures, such as replacing a bearing, would permit the same seal to be reused at a significant cost savings. Damage to the seal during its removal which results in parts of the seal being torn away can cause internal components of the engine to become fouled.

As a part of the United States Army's preventative maintenance program for its T703-AD-700 helicopter engine, the seals on a shaft in the output freewheeling unit of the engine are regularly replaced. The output freewheeling unit drives both the main rotor and the rear rotor on the helicopter. Presently, the engine must be removed from the aircraft frame so that the seal can be pried out with a screwdriver, or similar tool. It can take 16 hours to remove the engine from the aircraft, remove and replace the seal, and reinstall the engine on the aircraft. In addition, it is easy to damage the engine (e.g., shaft bearings adjacent the seal), as the seal is being pried out of the housing.

Installation of the new seals also presents the danger of damage to the engine. The internal components of the engine should be subjected to as little force as possible when installing the seal. In addition, the seal may be damaged during its installation. In the past, the seals have been installed using a hammer and a punch which do not permit a precise or uniform application of force, and cannot guide a seal to its final position. If the seal is not properly aligned with the shaft, it may become hung up, causing damage to the seal. The seal may also be subjected to being irregularly deformed to fit over the shaft. Because the seal cannot be clearly seen as installed, it is difficult to make certain that the seal is fully and properly seated within the engine. If the seal is not properly seated, leakage will occur. However, if the seal is already seated, additional force applied to the seal can damage it or the surrounding engine components.

SUMMARY OF THE INVENTION

Among the several objects and features of the present invention may be noted the provision of a seal removal tool which removes the seal with virtually no contact with components in the vicinity of the seal; the provision of such a tool which can remove the seal quickly; the provision of such a removal tool which can remove a seal from an aircraft engine without removing the engine from the aircraft frame; the provision of such a removal tool which can remove the seal intact; the provision of such a removal tool which can remove the seal without passing between the seal and the surface against which it seals; and the provision of such a seal removal tool which has few components and is easy to operate.

Further among the several objects and features of the present invention may be noted the provision of a method for removing a seal in which nothing is inserted between the seal and a surface in sealing engagement with the seal.

Still further among the several objects and features of the present invention may be noted the provision of a seal installation tool which accurately positions the seal upon installation; the provision of such an installation tool which gradually deforms the seal for placement on the surface to be sealed; the provision of such an installation tool which precisely guides the seal to its installed position; the provision of such an installation tool which can simultaneously install two seals; the provision of such an installation tool which has minimal contact with the structure on which the seal is to be placed; and the provision of such a seal installation tool which is easy to use.

Also among the several objects and feature of the present invention may be noted the provision of a method for simultaneously installing two seals and the provisions of each a method which protects the seals and engine components from damage.

Generally, a seal removal tool of the present invention comprises a gripper sized and shaped for reception in a hole in a housing where the seal is located. The gripper has fingers capable of movement into engagement with the seal in the hole for gripping the seal. A puller bolt constructed for sliding reception through the gripper has a first end shaped for engagement with the gripper for moving the fingers into gripping engagement with the seal upon relative movement of the puller bolt and gripper. The puller bolt includes a threaded portion extending outwardly from the gripper toward a second end of the puller bolt opposite the first end. A bridge engageable with the housing and extending over the hole in the housing has an opening therein slidably receiving the threaded portion of the puller bolt through the bridge. A first nut capable of threaded reception on the threaded portion of the puller bolt is rotatable on the threaded portion of the puller bolt to bear against the gripper for pulling the puller bolt through the gripper such that the first end of the puller bolt engages the gripper to force the fingers into gripping engagement with the seal. A second nut capable of threaded reception on the threaded portion of the puller bolt, is rotatable on the threaded portion of the puller bolt to bear against the bridge for pulling the puller bolt and gripper in a direction out of the hole in the housing thereby to remove the seal from the shaft.

In another aspect of the present invention, a method for removing an annular seal from a shaft includes the step of inserting a gripper into a hole to a location adjacent to an axially outer side of the seal such that no portion of the gripper passes between the seal and the shaft. The gripper is actuated to grip the seal on the axially outer side, and is thereafter pulled out of the hole.

In yet another aspect of the present invention, an installation tool for installing an annular seal on an end portion of a shaft located in a housing comprises a seal expander engageable with the end portion of the shaft and capable of being held in a fixed position relative to the shaft. The seal expander has a surface which tapers inwardly in a direction axially outward from the end of the shaft. A seal pusher constructed for engaging the annular seal on one end thereof is capable of pushing the annular seal axially inwardly toward the shaft so that an internal diameter portion of the seal engages the surface of the seal expander at a location axially outwardly of the end portion of the shaft. The seal expander surface gradually expands the internal diameter of the annular seal as it approaches the shaft so that the seal may slide onto the shaft.

In still another aspect of the present invention a method for simultaneously installing two seals on a shaft. A rod is inserted through the tubular shaft and through seal pushers, one of which is fixed to the rod for movement with the rod. The seals are engaged on respective seal pushers and a drive nut drives the seal pusher toward the shaft for installing the seals on the shaft.

Other objects and features of the present invention will be in part apparent and in part pointed out hereinafter.

BRIEF DESCRIPTION OF THE DRAWINGS

FIG. 2 is an exploded perspective of the seal removal tool;

FIG. 3 is a bottom plan view of the seal removal tool;

FIG. 8 is a perspective of the seal.

Corresponding reference characters indicate corresponding parts throughout the several views of the drawings.

DETAILED DESCRIPTION OF THE PREFERRED EMBODIMENT

Figure 1:
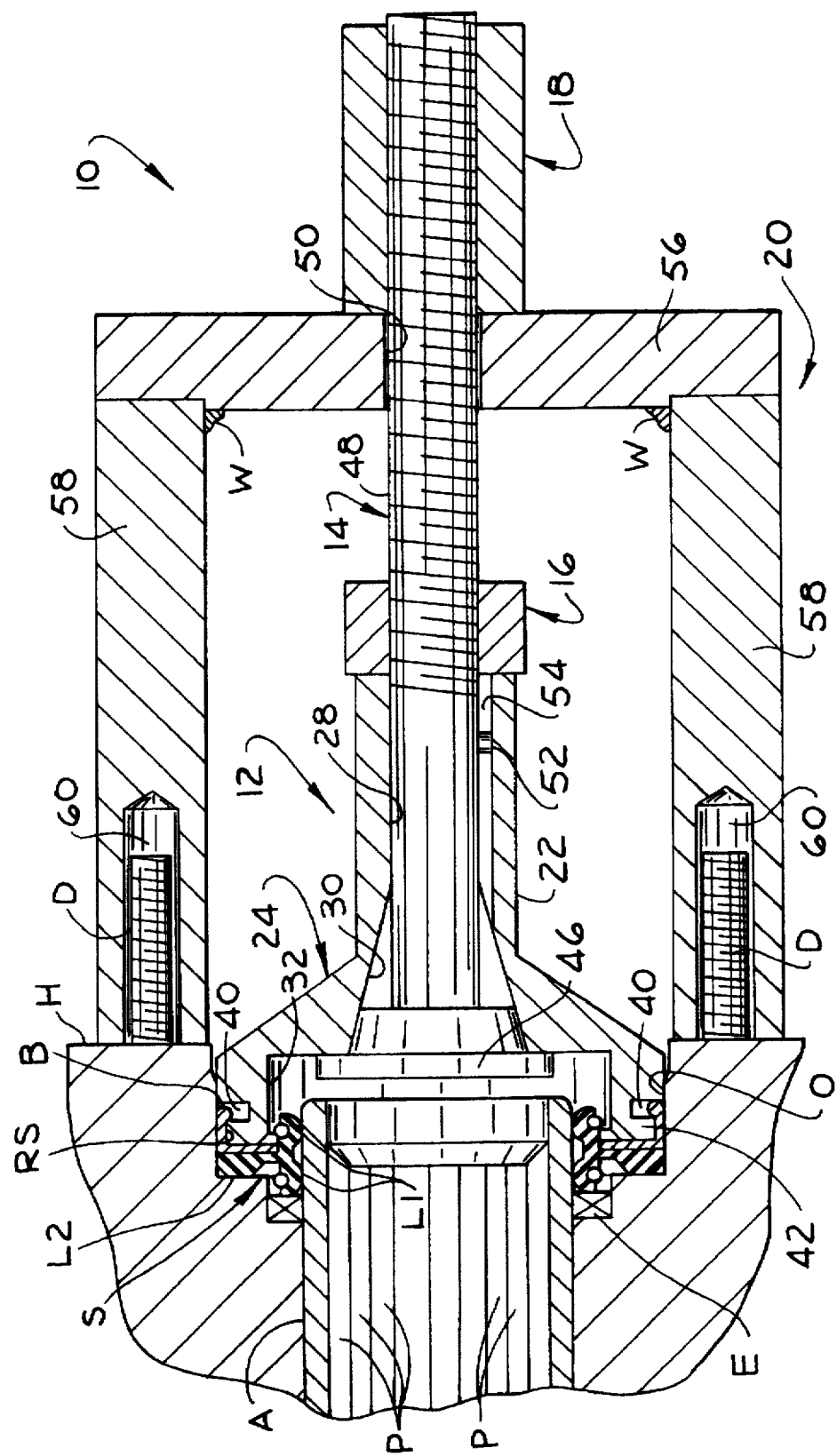
FIG. 1 is a cross section of a seal removal tool shown removing seal from a shaft of a helicopter engine.

Referring now to the drawings, and in particular to FIGS. 1–4, a seal removal tool 10 is shown to comprise a gripper 12, a puller bolt 14 received through the gripper, a gripper actuating (first) nut 16, a puller (second) nut 18 and a bridge 20 (the reference numbers generally indicating their subjects). In the illustrated embodiment the seal to be removed is an annular seal S, shown in FIGS. 1 and 8 to include a relatively rigid metal rim R joined to an elastic silicone body including a pair of annular lips L1 on its internal diameter which sealingly engage a shaft A in a housing H of an engine (e.g., a helicopter engine). The silicone body also has a radially outer lip L2 sealingly engaged with the housing H in a seal hole O in the housing. Annular tension springs T around the radially inner lips L1 urge them into engagement with the shaft A. The metal rim R has a radially inwardly facing surface RS located generally at the periphery of the seal S on the axially outer side of the seal.

Figure 4:
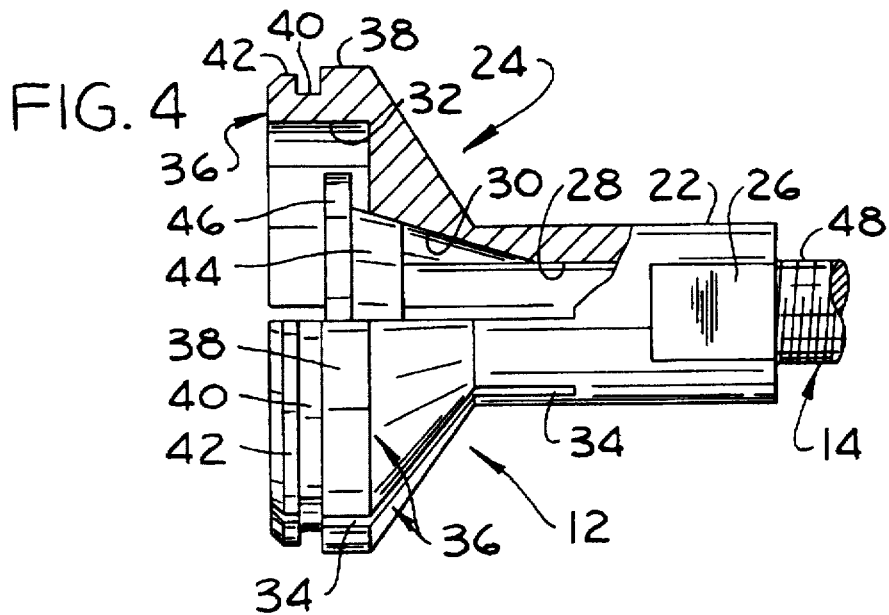
FIG. 4 is a fragmentary elevation of a gripper and puller bolt of the seal removal tool.

The gripper 12 is generally tubular in shape, having a generally cylindrical sleeve portion 22 at one end of the gripper and an outwardly flaring portion, generally indicated at 24, at its opposite end. The sleeve portion 22 is formed with opposing flats 26 (only one is shown) engageable with jaws of a wrench (not shown). Referring to FIG. 4, the interior of the gripper 12 through which the puller bolt 14 is slidingly received includes a generally cylindrical portion 28, an outwardly flaring wedge portion 30 and a larger cylindrical shaft-receiving portion 32. As shown in FIGS. 2 and 3, slots 34 in the outwardly flaring portion 24 extending axially inwardly from the opposite end of the gripper 12 define six fingers, generally indicated at 36. The gripper 12 is made of a suitable material, such as spring steel, which permits the fingers 36 to be resiliently moved radially outwardly by operation of the puller bolt 14, as described more fully hereinafter. As shown in FIG. 1, the diameter of the gripper 12 in the region of its opposite end is sized for reception into the seal hole O in the housing, generally around an end portion of the shaft A on which the seal S to be removed is engaged.

The ends of the fingers 36 which are received in the seal hole O have radially outwardly facing peripheral surfaces 38 in the form of arcuate segments of a cylindrical surface engageable with the sides of the seal hole (FIG. 1). As shown in FIG. 4, there is a radially inwardly located channel 40 extending along an arc generally parallel to the arc of the peripheral surface 38, nearer the end of each finger 36. The channel 40 is sized and shaped for receiving a portion of the annular seal S (i.e., an annular bead B on the axially outer end of the metal rim R of the seal) for use in gripping the seal. At the end of each finger 36 is located an arcuate lip projecting radially outwardly from the bottom of the channel 40, but located radially inwardly from the peripheral surface 38. This construction permits the lip 42 and channel 40 to be disposed opposite a radially inwardly facing surface RS of the metal rim of the seal, as may been seen in FIG. 1.

The puller bolt 14 is formed with a wedge element 44 generally at its first end which has the shape of a frustum of a cone. The wedge element 44 of the puller bolt 14 is engageable with the wedge portion 30 of the interior of the gripper 12 upon axial movement of the puller bolt to wedge apart the fingers 36 into gripping engagement with the seal S. A stop flange 46 is engageable with the gripper 12 on the axially inner end of its shaft-receiving portion 32 to stop the axial movement of the puller bolt 14 in a direction which causes further expansion of the fingers 36. In this way, the amount which the fingers 36 are moved outwardly is limited to a predetermined amount.

A stem 48 extending axially from the wedge element 44 of the puller bolt 14 includes a threaded portion which extends outwardly from the sleeve portion of the gripper 12 and through an opening 50 in the bridge 20. In absence of the stop flange 46, actuating nut 16, and puller nut 18, the stem 48 of the puller bolt would be freely slidable in an axial direction relative to both the gripper 12 and the bridge 20. However, as may be seen in FIG. 1, the portion of the stem within the sleeve portion 22 of the gripper has a key 52 which is received in a keyway 54 in the cylindrical portion 28 of the interior of the gripper. The key 52 and keyway 54 cooperate to prevent relative rotational movement of the gripper 12 and puller bolt 14, while permitting axial movement relative to each other.

The actuating nut 16 is threadably received on the threaded portion of the stem 48 of the puller bolt 14 into engagement with the sleeve portion 22 of the gripper 12. By turning the actuating nut 16 to bear against the gripper 12, the puller bolt 14 is pulled through the gripper in a direction away from the seal S. The axial movement of the puller bolt 14 causes its wedge element 44 to engage the wedge portion 30 of the interior of the gripper 12 and move the fingers 36 radially outwardly to bring their lips 42 into engagement with the radially inwardly facing surface RS of the seal S. At such time as the stop flange 46 engages the gripper 12 (FIG. 1) the puller bolt 14 and gripper are locked together for a conjoint axial motion.

The puller nut 18 is threadably received on the threaded portion of the stem 48 into engagement with a cross member 56 of the bridge 20 on the side axially outward from the seal hole O. The bridge 20 also has legs 58 attached in a suitable manner such as by welds W on opposite ends of the cross member 56. The legs 58 engage the housing H when the seal removal tool 10 is being used. The free ends of the legs 58 each have openings 60 which are sized to receive studs D on the housing to hold the bridge 20 from movement relative to the housing. Rotation of the puller nut 18 on the threaded portion of the stem 48 in a direction which causes the puller nut to bear against the cross member 56 pulls the puller bolt 14 and gripper 12 out of the seal hole O. The seal S is simultaneously removed as a result of the gripping engagement of the lips 42 of the fingers 36 with the radially inwardly facing surface RS of the metal rim R. It may be seen that the cross member 56 and legs 58 transfer the loads associated with pulling the seal S to the housing H so that the shaft A and other internal components (e.g., shaft bearings E) of the engine are subjected to minimal forces.

Having described the construction of the seal removal tool 10, its operation in the context of removing a shaft seal S from a helicopter engine will now be described. Certain parts of the engine may need to be removed to expose the seal hole O in the engine housing H. It will be readily apparent that the precise order of the steps described can be altered without departing from the scope of the present invention. If not already assembled, the puller bolt 14 is inserted stem-first through the gripper 12 so that its key 52 is received in the keyway 54 located in the cylindrical portion 28 of the interior of the gripper. The actuating nut 16 is threaded onto the end of the stem 48 and into engagement with the sleeve portion 22 of the gripper. The nut 16 is tightened further until the wedge element 44 of the puller bolt 14 engages the wedge portion 30 of the interior of the gripper 12, but does not cause the fingers 36 to be radially expanded.

The assembly of the puller bolt 14 and gripper 12 so formed may be inserted into the seal hole O in the housing of the engine. The lips 42 and channels 40 of the fingers 36 pass radially inwardly of the radially inwardly facing surface RS of the seal S until the lips engage the metal rim R. The lips 42 and channels 40 are thus positioned on an axially outer (first) side of the seal. At the same time, an end of the shaft A is received in the shaft-receiving portion 32 of the interior of the gripper 12. It will be noted that the lips 42 and channels 40 at no time pass between the shaft A and the seal S, or the seal hole wall and the seal.

Wrenches (not shown) are applied to the actuating nut 16 and to the sleeve portion 22 of the gripper 12 (the jaws of the wrenches engaging the flats 26 on the sleeve). The actuating nut 16 is turned while the gripper 12 is held stationary so that the nut pulls the puller bolt 14 through the gripper in a direction axially outwardly from the seal hole O. Engagement of the wedge element 44 of the puller bolt 14 with the wedge portion 30 of the interior of the gripper 12 causes the fingers 36 to be moved radially outwardly to bring the lips 42 into gripping engagement with the radially inwardly facing surface RS of the seal S. The annular bead B of the metal rim R is partially received in the channels 40. Expansion of the fingers 36 is halted by engagement of the stop flange 46 of the puller bolt 14 with the gripper 12.

The wrenches are removed from the actuating nut 16 and gripper 12, and the bridge 20 is placed on the housing H. The threaded end of the stem 48 of the puller bolt 14 is received through the opening 50 in the cross member 56 of the bridge, and the holes 60 in the ends of the legs 58 receive the studs D on the housing H. The actuating nut 16 and stop flange 46 of the puller bolt 14 lock the gripper 12 and puller bolt together for conjoint axial movement. The puller nut 18 is threaded onto the end of the threaded portion of the stem 48 and into engagement with the cross member 56. A wrench is now applied to the puller nut 18 for further rotation to bear against the cross member 46 and to pull the puller bolt 14, gripper 12 and seal S held on the gripper out of the seal hole O. Once the seal S is loosed from the shaft A, the entire seal removal tool 10 can be pulled away from the housing H to completed the removal of the seal. A similar procedure would be carried out to remove the seal (not shown) on the opposite end of the shaft A within the housing H.

Figure 5:
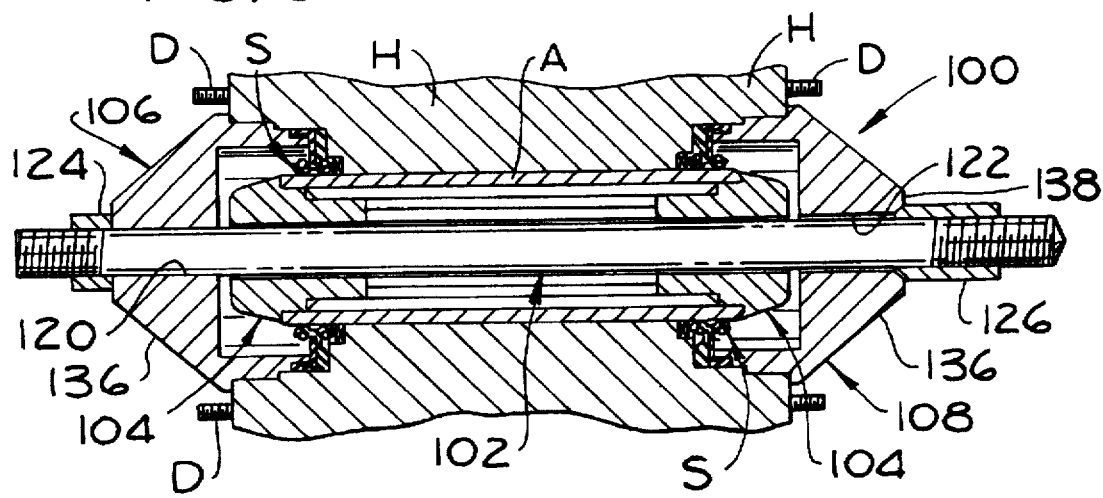
FIG. 5 is a section of a seal installation tool shown at the completion of simultaneous installation of two seals on the helicopter engine.
Figure 6:
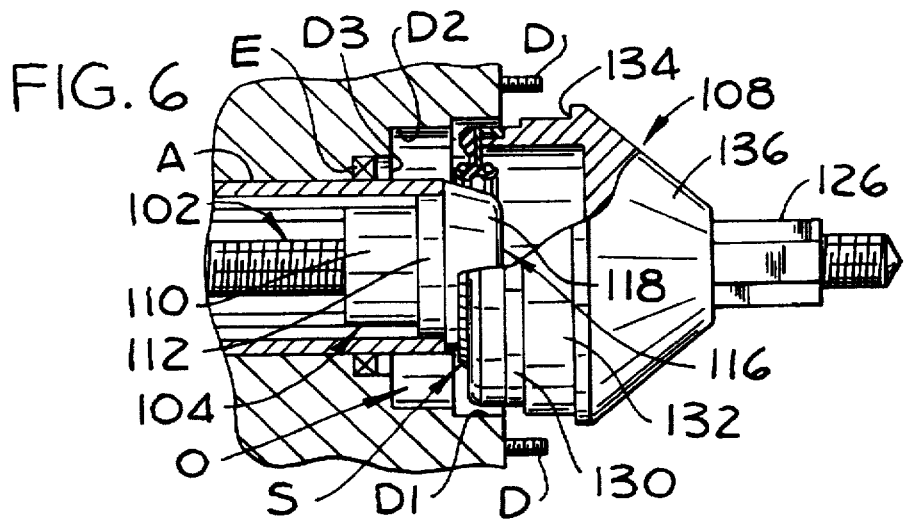
FIG. 6 is a fragmentary partial section of the seal installation tool shown during the installation procedure.
Figure 7:
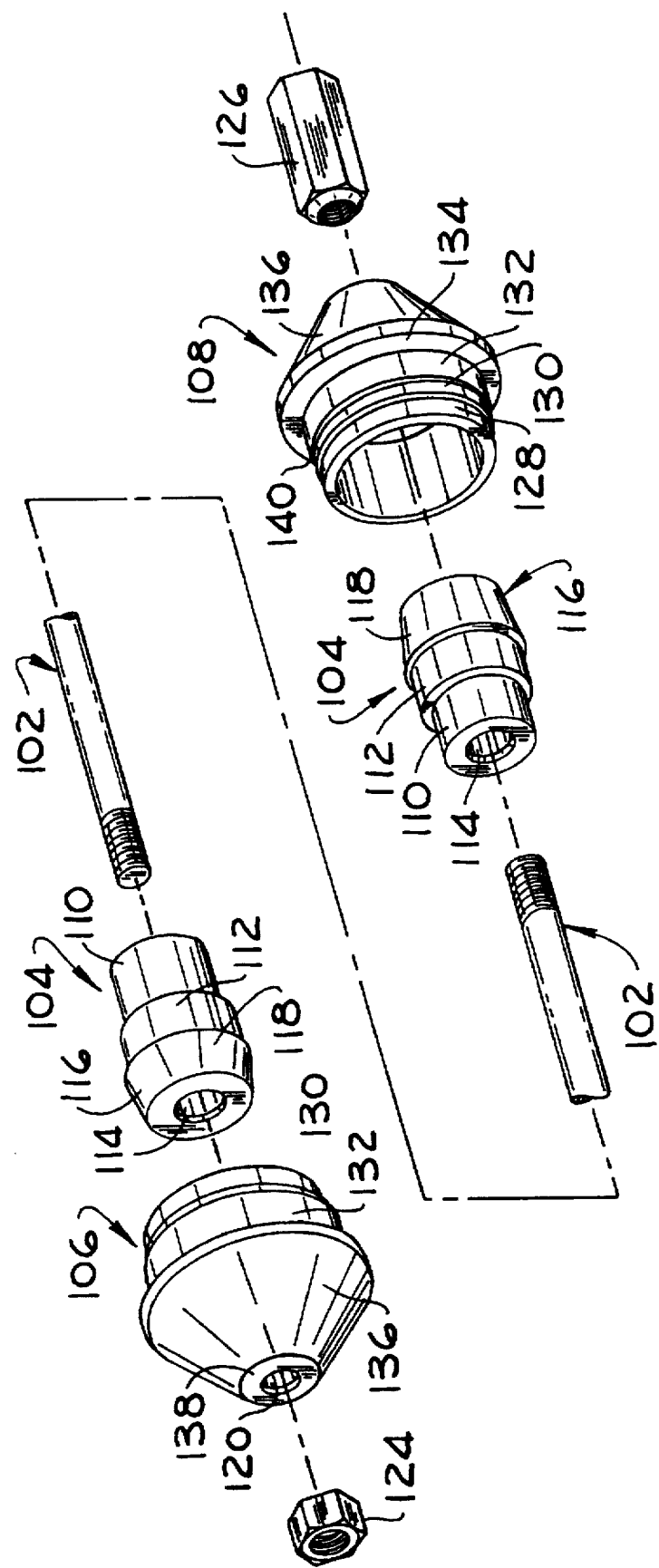
FIG. 7 is an exploded perspective of the seal installation tool.

A seal installation tool 100 of the present invention is shown in FIGS. 5–7 to comprise a threaded guide rod 102, a pair of seal expanders 104, a fixed seal pusher 106 and a free seal pusher 108 (the reference numbers indicating their subjects generally). As shown in FIG. 5, the seal installation tool 100 is used to simultaneously install both seals S on opposite end portions of the shaft A, which is tubular in shape. The seal expanders 104 each include a first end portion 110 and a middle portion 112 which are received inside the shaft A. The first end portion 110 and middle portion 112 are sized for a snug friction fit within the shaft to locate a passage 114 through the seal expander 104 generally coaxially with the shaft. The first end portion 110 is sized to engage splines P within the shaft A, and the middle portion 112 is sized to engage the shaft immediately adjacent its end where it is free of splines. A second end portion, generally indicated at 116, engages the end of the shaft A and has an seal expanding surface 118 in the form of a frustum of a cone which tapers inwardly in a direction axially outwardly from the shaft. The diameters of the first end portion 110, the middle portion 112, and diametrical dimension of the second end portion 116 immediately adjacent to the middle portion, are preferably held to close tolerances (e.g., –0.002 inches).

The threaded guide rod 102 is received through the passages 114 in the seal expanders 104 installed in the shaft A and projects axially outwardly from the engine housing H on both ends of the shaft. The passages 114 in the seal expanders 104 are smooth and permit the guide rod 102 to slide freely through the seal expanders, while locating the guide rod generally coaxially with the shaft A. The fixed seal pusher 106 has an internally threaded opening 120 through it capable of threaded reception on the guide rod 102. The free seal pusher 108 has a smooth opening 122 which slidingly receives the guide rod 102 through the free seal pusher. A lock nut 124 is threaded onto an end of the guide rod 102 and into engagement with the fixed seal pusher 106 to lock the fixed seal pusher for axial movement with the guide rod. A drive nut 126 is threadably received on an end of the guide rod 102 and into engagement with the free seal pusher 108. Rotation of the drive nut 126 which moves it against the free seal pusher 108 simultaneously pushes the free seal pusher into the seal hole O on one side of the housing H, while pulling the fixed seal pusher 106 and guide rod 102 into the seal hole on the other side of the housing.

In the preferred embodiment, the fixed and free seal pushers are substantially identical, except for the threaded opening 120 of the fixed seal pusher 106 and the smooth opening 122 of the free seal pusher 108. Thus, the following description of the construction of the free seal pusher 108 applies also to the fixed seal pusher 106, and the substantially identical parts of each seal pusher will be indicated by the same reference number. The free seal pusher 108 has a cylindrical seal-receiving surface 128 on its axially inner end sized to receive and hold one of the seals S for installing the seal on an end portion of the shaft A. Moving axially outwardly from the seal receiving surface 128, there is a first cylindrical guide surface 130, a second cylindrical guide surface 132, and a stop shoulder 134. The guide surfaces 130, 132 and stop shoulder 134 are engageable with the housing H to guide and limit the insertion of the seal S onto the end portion of the shaft A. An axially outer portion 136 of the free seal pusher 108 is generally frustoconically shaped, having an axially outwardly facing annular surface 138 engageable with the drive nut 126. The corresponding annular surface 138' on the fixed seal pusher 106 is engageable with the lock nut 124. The annular surface 138 is chamfered around the opening 122 to correspond to the shape of the drive nut 126 (FIG. 5).

The use of the seal installation tool 100 to simultaneously install two seals S on opposite end portions of the shaft A will now be described with particular reference being made to FIGS. 5 and 6. The seal expanders 104 are inserted into opposite ends of the shaft until their second end portions 116 are firmly engaged with the corresponding ends of the shaft. The threaded guide rod 102 is inserted through the passages 114 in the seal expanders 104 so that they are generally coaxial with the shaft A. Thus, it may be seen that the seal expanders 104 also serve as a mechanism for aligning the guide rod 102 with the shaft A. Each of the seals S to be installed is engaged on a respective seal-receiving surface 128 of a corresponding seal pusher (106 or 108). The fixed seal pusher 106 is threaded onto one end of the guide rod 102 and the lock nut 124 is threaded on the same end into engagement with the annular surface 138' of the fixed seal pusher to fix it for movement axially with the guide rod. The free seal pusher 108 slides onto the opposite end of the guide rod 102 and the seal pushers 106, 108 are positioned generally adjacent to the seal holes O.

The drive nut 126 is threaded onto an end of the guide rod 102 and into engagement with the annular surface 138 of the free seal pusher 108. Further rotation of the drive nut 126 causes it to bear against the annular surface 138 and to pull the guide rod 102 through the free seal pusher 108 in a direction axially outward of the seal hole O. This motion causes the fixed seal pusher 106 to be pulled into one seal hole, at the same time the free seal pusher 108 is pushed by the drive nut 126 into the opposite seal hole. The annular lips L1 of each seal S engage the axially outer end of a corresponding seal expander 104 generally on or adjacent to the internal diameter of the seal S. As the seal pushers 106, 108 continue to push the seals S in axially inward directions toward the ends of the shaft A, the lips L1 ride up onto the seal expanding surfaces 118 of the seal expanders 104, and the internal diameters of the seals are gradually expanded as they advance up the seal expanding surfaces. In this way the seals S are gradually stretched to an internal diameter closer to the outside diameter of the shaft A so that the seals ride easily onto the shaft with minimal chance of damage to the lips L1 which seal against the shaft. It will be readily apparent to those of ordinary skill in the art that the precise order of the foregoing steps may be altered without departing from the scope of the present invention.

The seals S are guided by the installation tool 100 so that they are substantially coaxial with the shaft A as they are installed. In the first instance, the guide rod 102 on which the seal pushers are mounted aligns the seal pushers 106, 108 and seals S thereon with the axis of the shaft A. Subsequent engagement of the seals with the seal expanders 104 further aids alignment of the seals. Referring now to FIG. 6, it may be seen that the seal hole O is formed with several sections of different diameters (designated D1, D2 and D3, respectively). The first cylindrical guide surfaces 130 of the seal pushers 106, 108 are engageable with the largest diameter section D1 of the seal hole O (see FIG. 5) to provide rigid and positive coaxial alignment between the seals S and shaft A. Upon further insertion of the seal pushers 106, 108, their second cylindrical guide surfaces 132 engage the seal holes in their smaller diameter sections D2, providing further rigid alignment of the seals and shaft.

As installed, the radially inner sealing portions of the seals S (i.e., lips L1) are received in the smallest diameter sections D3 of the seal holes O. It is important that the seals S be fully seated within the seal holes, with their radially outer lips L2 engaging the housing at the bottom of the smaller diameter sections D2 of the seal holes. However, it is also important that the seals S not be damaged by pushing against the bottom of the seal hole O after they are fully seated. In that regard, the stop shoulders 134 on the axially outer portions 136 of the seal pushers 106, 108 are engageable with the housing H around the entrances to the seal holes O to limit the depth to which the seal pushers may advance into the seal holes. The seal S on each seal pusher can only be inserted into the seal hole O to a depth approximately equal to the distance between the stop shoulder 134 and a shoulder 140 (FIG. 7) between the seal-receiving surface 128 and second cylindrical guide surface 130 on the seal pusher. Thus, even if the seals S do not seat simultaneously, the stop flange 134 on the seal pusher (106 or 108) associated with the seated seal prevents it from being crushed by the application of force necessary to seat the other seal. Moreover, the shaft bearings E are protected from the undesirable application of pressure from the seals S by engagement of the stop shoulders 134 with the housing H. The stop shoulders 134, the seal expanders 104 and the first and second guide surfaces 128, 130 cooperate to install the seals S with minimal risk of damage to the seal, the shaft A, or shaft bearings E located within the housing H.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A seal removal tool for removing an annular seal from around a shaft located in a hole in a housing, the tool comprising:

a gripper sized and shaped for reception in the hole, the gripper having fingers capable of movement into engagement with the seal in the hole for gripping the seal, the gripper having opposing flats sized and arranged for receiving a wrench for holding the gripper from rotation;

a puller bolt constructed for sliding reception through the gripper, a first end of the puller bolt being shaped for engagement with the gripper for moving the fingers into gripping engagement with the seal upon relative movement of the puller bolt and gripper, the puller bolt including a threaded portion extending outwardly from the gripper toward a second end of the puller bolt opposite the first end;

a bridge engageable with the housing for extending over the hole in the housing, the bridge having an opening therein slidably receiving the threaded portion of the puller bolt through the bridge;

a first nut capable of threaded reception on the threaded portion of the puller bolt, the first nut being rotatable on the threaded portion of the puller bolt to bear against the gripper while the gripper is held from rotation by a wrench received on the flats of the gripper for pulling the puller bolt through the gripper such that the first end of the puller bolt engages the gripper to force the fingers into gripping engagement with the seal;

a second nut capable of threaded reception on the threaded portion of the puller bolt, the second nut being rotatable on the threaded portion of the puller bolt to bear against the bridge for pulling the puller bolt and gripper in a direction out of the hole in the housing thereby to remove the seal from the shaft.

2. A seal removal tool as set forth in claim 1 wherein the gripper includes peripheral surface means, each finger of the gripper including a channel located radially inwardly of said peripheral surface means of the gripper and sized for receiving a portion of the seal therein, and a lip located on an opposite side of the channel from said peripheral surface means, the lip being located inwardly of said peripheral surface means.

3. A seal removal tool as set forth in claim 1 wherein the bridge comprises first and second legs engageable with the housing on opposite sides of the hole and a cross member extending between and interconnecting the legs, each leg being constructed for engaging the housing to hold the bridge from rotation relative to the housing.

4. A seal removal tool as set forth in claim 3 wherein the first and second legs each have an opening on their ends opposite the cross member sized and shaped for receiving a stud on the housing.

5. A seal removal tool as set forth in claim 1 further comprising a stop for limiting the movement of the fingers caused by relative movement of the puller bolt and gripper.

6. A seal removal tool as set forth in claim 5 wherein the stop comprises a flange on the first end of the puller bolt sized for engaging the gripper to stop relative movement of the gripper and puller bolt which movement causes the fingers to move radially outwardly.

7. A seal removal tool for non-destructively removing an annular seal from around a shaft located in a hole in a housing, the seal having a thickness, the tool comprising:

a gripper sized and shaped for reception in the hole, the gripper having fingers capable of movement into engagement with the seal in the hole for gripping the seal, the gripper including peripheral surface means, each finger of the gripper including a channel located radially inwardly from the said peripheral surface means of the gripper and sized for non-destructively receiving a portion of the seal therein, the channel having a width less than the thickness of the seal, and a lip located on an opposite side of the channel from said peripheral surface means, the lip being located radially inwardly of said peripheral surface means, the gripper being generally tubular and including a sleeve portion generally at one end of the gripper, an outwardly flaring portion generally at an opposite end of the gripper, and a plurality of slots extending axially inwardly from said opposite end of the gripper to form the fingers;

a gripper actuator mechanism for selectively moving the fingers into non-destructive engagement with the seal such that a portion of the seal less than the full thickness of the seal is received in the channel, the gripper actuator mechanism comprising a puller bolt constructed for sliding reception through the gripper, relative movement of the puller bolt and gripper in a first direction causing the fingers to move into gripping engagement with the seal, and a first nut capable of threaded reception on a threaded portion of the puller bolt, the first nut being rotatable on the threaded portion of the puller bolt to bear against the gripper for pulling the puller bolt through the gripper such that the first end of the puller bolt engages the gripper to force the fingers into gripping engagement with the seal;

a puller mechanism for pulling the gripper outwardly from the hole to non-destructively remove the seal from the shaft;

a stop for limiting the movement of the fingers caused by relative movement of the puller bolt and gripper.

8. A seal removal tool as set forth in claim 7 wherein the puller mechanism comprises a bridge engageable with the housing and extending over the hole in the housing, the bridge having an opening therein slidably receiving the threaded portion of the puller bolt through the bridge, and a second nut capable of threaded reception on the threaded portion of the puller bolt, the second nut being rotatable on the threaded portion of the puller bolt to bear against the bridge for pulling the puller bolt and gripper in a direction out of the hole in the housing thereby to remove the seal from the shaft.

9. A seal removal tool as set forth in claim 7 wherein the stop comprises a flange on the first end of the puller bolt sized for engaging the gripper to stop relative movement of the gripper and puller bolt which movement causes the fingers to move radially outwardly.

10. A seal removal tool for removing an annular seal from around a shaft located in a hole in a housing, the tool comprising:

a gripper sized and shaped for reception in the hole, the gripper having fingers capable of movement into engagement with the seal in the hole for gripping the seal;

a puller bolt constructed for sliding reception through the gripper, a first end of the puller bolt being shaped for engagement with the gripper for moving the fingers into gripping engagement with the seal upon relative movement of the puller bolt and gripper, the puller bolt including a threaded portion extending outwardly from the gripper toward a second end of the puller bolt opposite the first end;

a bridge engageable with the housing for extending over the hole in the housing, the bridge having an opening therein slidably receiving the threaded portion of the puller bolt through the bridge, the bridge comprising first and second legs engageable with the housing on opposite sides of the hole and a cross member extending between and interconnecting the legs, each leg being constructed for engaging the housing to hold the bridge from rotation relative to the housing, the first and second legs each have an opening on their ends opposite the cross member sized and shaped for receiving a stud on the housing;

a first nut capable of threaded reception on the threaded portion of the puller bolt, the first nut being rotatable on the threaded portion of the puller bolt to bear against the gripper for pulling the puller bolt through the gripper such that the first end of the puller bolt engages the gripper to force the fingers into gripping engagement with the seal;

a second nut capable of threaded reception on the threaded portion of the puller bolt, the second nut being rotatable on the threaded portion of the puller bolt to bear against the bridge for pulling the puller bolt and gripper in a direction out of the hole in the housing thereby to remove the seal from the shaft.

11. A seal removal tool as set forth in claim 10 wherein the gripper includes peripheral surface means, each finger of the gripper including a channel located radially inwardly of said peripheral surface means of the gripper and sized for receiving a portion of the seal therein, and a lip located on an opposite side of the channel from said peripheral surface means, the lip being located inwardly of said peripheral surface means.

12. A seal removal tool as set forth in claim 10 further comprising a stop for limiting the movement of the fingers caused by relative movement of the puller bolt and gripper.

13. A seal removal tool as set forth in claim 12 wherein the stop comprises a flange on the first end of the puller bolt sized for engaging the gripper to stop relative movement of the gripper and puller bolt which movement causes the fingers to move radially outwardly.

14. A seal removal tool for removing an annular seal from around a shaft located in a hole in a housing, the tool comprising:

a gripper sized and shaped for reception in the hole, the gripper having fingers capable of movement into engagement with the seal in the hole for gripping the seal;

a puller bolt constructed for sliding reception through the gripper, a first end of the puller bolt being shaped for engagement with the gripper for moving the fingers into gripping engagement with the seal upon relative movement of the puller bolt and gripper, the puller bolt including a threaded portion extending outwardly from the gripper toward a second end of the puller bolt opposite the first end;

a bridge engageable with the housing for extending over the hole in the housing, the bridge having an opening therein slidably receiving the threaded portion of the puller bolt through the bridge;

a first nut capable of threaded reception on the threaded portion of the puller bolt, the first nut being rotatable on the threaded portion of the puller bolt to bear against the gripper for pulling the puller bolt through the gripper such that the first end of the puller bolt engages the gripper to force the fingers into gripping engagement with the seal;

a second nut capable of threaded reception on the threaded portion of the puller bolt, the second nut being rotatable on the threaded portion of the puller bolt to bear against the bridge for pulling the puller bolt and gripper in a direction out of the hole in the housing thereby to remove the seal from the shaft;

a stop for limiting the movement of the fingers caused by relative movement of the puller bolt and gripper.

15. A seal removal tool as set forth in claim 14 wherein the stop comprises a flange on the first end of the puller bolt sized for engaging the gripper to stop relative movement of the gripper and puller bolt which movement causes the fingers to move radially outwardly.

* * * * *